United States Patent [19]
Zahnd

[11] Patent Number: 5,887,526
[45] Date of Patent: Mar. 30, 1999

[54] SHAFT ENCODER FOR A CYLINDER OF A PRINTING PRESS

[75] Inventor: Andreas Zahnd, Zollikofen, Switzerland

[73] Assignee: Maschinenfabrik WIFAG, Bern, Switzerland

[21] Appl. No.: 838,713

[22] Filed: Apr. 9, 1997

[30] Foreign Application Priority Data

Apr. 15, 1996 [DE] Germany .................. 196 14 818.9

[51] Int. Cl.⁶ .................................................. B41F 7/02
[52] U.S. Cl. .................. 101/486; 101/145; 101/218; 101/248
[58] Field of Search ............................ 101/486, 489, 101/247, 139, 140, 144, 145, 185, 218, 177

[56] References Cited

U.S. PATENT DOCUMENTS

| | | | |
|---|---|---|---|
| 3,870,936 | 3/1975 | Coberley | 101/248 |
| 4,495,583 | 1/1985 | Punater | 101/248 |
| 4,825,761 | 5/1989 | Buckett | 101/228 |
| 4,858,528 | 8/1989 | Inouye et al. | 101/484 |
| 5,387,860 | 2/1995 | Shibata et al. | 101/248 |
| 5,546,859 | 8/1996 | Hern | 101/226 |

OTHER PUBLICATIONS

*Diadar–Verfahren Massverkörperung*, Jun. 1996.

*Primary Examiner*—Eugene Eickholt
*Attorney, Agent, or Firm*—McGlew and Tuttle

[57] ABSTRACT

A process and device for synchronizing a cylinder of a printing press, which is pivoted up to its countercylinder, and to a shaft encoder suitable for carrying out this process.

18 Claims, 6 Drawing Sheets

SHAFT ENCODER FOR A CYLINDER OF A PRINTING PRESS

FIELD OF THE INVENTION

The present invention pertains to a shaft encoder for a cylinder of a printing press with a measuring device arranged at the cylinder secured against rotation in relation to an axis of rotation of the cylinder and a said reference device, wherein the position of the measuring means in relation to the reference device is detected, and the angular position of the cylinder in relation to a frame of the printing press is determined from this. The invention also pertains to a process for synchronizing the rotary movement of the cylinder during the pivoting of that cylinder toward a countercylinder.

BACKGROUND OF THE INVENTION

Shaft encoders are used as transducers for rotary movements, in the manufacture of printing presses primarily for the rotary movements of the printing cylinders. Prior-art shaft encoders convert a rotary movement according to the principle of the photoelectric scanning of DIADUR cyclotomies into electric signals, which are processed in numeric and memory-programmable controls or regulating devices or are used alone for position indication. Besides the incremental signals, a reference mark signal is additionally available for the reproduction of reference points. Prior-art shaft encoders have a rotor, which is rigidly connected to the shaft, whose angular position is to be determined, and a stator, which is rigidly connected to the press part in relation to which the corresponding angular position of the shaft is to be determined.

The problem occurs especially in the case of printing cylinders that can be pivoted off that besides the spin of a cylinder, i.e., rotation of the cylinder around its longitudinal axis, a pivoting movement around a pivot axis of the cylinder also takes place. The pivoting movement is superimposed to the spin of the cylinder. If a cylinder pivoted off is pivoted again onto its countercylinder into the printing position, the angular positions of the two printing cylinders must be exactly coordinated with one another, i.e., the rotary movements of the two cylinders must be synchronized during the pivoting up. This synchronization is especially problematic in the case of the flying change from one printing position to another, in which printing cylinders are pivoted in relation to one another and are brought into the printing position during full production. The two cylinders must run continuously synchronously during the pivoting up.

The zero position, i.e., the angular position which the cylinder pivoted off assumes in the printing position, changes continuously during the pivoting off and pivoting up in the case of prior-art shaft encoders. Due to the only finite velocity of the electronic control unit, this results in synchronization problems, as a consequence of which an appreciable loss of paper occurs until the two cylinders to be brought into the printing position are running perfectly synchronously.

SUMMARY AND OBJECTS OF THE INVENTION

The primary object of the present invention is to simplify the synchronization of the rotary movement of a cylinder of a printing press, which is to be pivoted toward a countercylinder, with the rotary movement of that countercylinder. Moreover, a shaft encoder shall be provided, with which the angular position of a cylinder of a printing press can be determined during all phases of operation of the cylinder.

According to the invention, a shaft encoder for a cylinder of a printing press is provided with a measuring means arranged at the cylinder secured against rotation in relation to an axis of rotation of the cylinder. A reference means is provided wherein the position of the measuring means in relation to the reference means is detected, and the angular position of the cylinder in relation to a frame of the printing press is determined from this. The reference means is mounted on the cylinder rotatably around the axis of rotation of the cylinder. In the case of a change in the angular position of the cylinder, it is maintained by a holding means in an at least essentially unchanged angular position in relation to the frame of the printing press.

The invention also includes a process for synchronizing the rotary movement of a pivotable cylinder of a printing press during the pivoting up of that cylinder to a countercylinder including determining the angular position of the cylinder during pivoting up in relation to a reference means, which is maintained in an at least approximately constant angular position in relation to the frame of the printing press even during the pivoting up.

Synchronization during the pivoting up of the cylinder toward its countercylinder becomes particularly simple according to the present invention by determining the angular position of the cylinder to be pivoted in relation to a reference means, which is maintained in a constant or at least nearly constant angular position during pivoting. Constancy means in this connection that even though the reference means can follow the pivoting movement of the cylinder, the reference means itself always assumes a constant or at least nearly constant angular position in relation to the frame of the printing press and is not rotated by the pivoting itself, as it happens according to the state of the art.

The present invention is based on a shaft encoder for a cylinder of a printing press, which has a measuring means, which is arranged at the cylinder nonrotatably in relation to an axis of rotation of the cylinder, and a reference means, in relation to which the angular position of the measuring means is detected, and the angular position of the cylinder in relation to the reference means is determined from this angular position. The term cylinder also represents here rollers or other bodies of rotation of the printing press, if their angular position is to be determined.

The reference means is maintained according to the present invention in an at least essentially unchanged, constant angular position in relation to a frame of the printing press, in each operating position of the cylinder. The reference means is mounted on the cylinder rotatably around the axis of rotation of the cylinder. The axis of rotation of the cylinder coincides with the longitudinal axis of the cylinder. The shaft encoder may be arranged on the drive shaft for the cylinder, or preferably at the torque-free end of the cylinder. If a drive motor for the cylinder is displaced, especially pivoted, with the cylinder, the shaft encoder according to the present invention may also be arranged on the motor shaft, forming a motor transducer.

Due to the reference means following the movements of the cylinder, which the cylinder performs during the operation, on the one hand, and, on the other hand, due to it being maintained in an at least essentially unchanged angular position, the zero position, in relation to the frame of the printing press, the angular position of the measuring means, and thus also that of the cylinder, is always scanned in relation to an absolute zero position, namely, in relation to the press frame. When the shaft encoder according to the present invention is used, the superimposition of the pivoting movement to the spin of the cylinder and the associated change in the angular position no longer need to be compensated by the electronic control unit. The synchronization, e.g., during the pivoting up of a printing cylinder to its counterpressure cylinder, is considerably expedited.

The shaft encoder according to the present invention is preferably designed as an integrated shaft encoder, in which the measuring means forms an inner ring, which is seated on the cylinder secured against rotation, and the reference means herefor forms an outer ring which surrounds the said inner ring and is rotatably mounted on the inner ring. Any rotatable mounting is suitable: A sliding pivot bearing is preferred. The inner ring or the measuring means is preferably fastened to the cylinder pin via a coupling, which equalizes axial movements and alignment deviations between the measuring means and the cylinder.

According to a preferred first exemplary embodiment of the present invention, a pendulum arm is fastened, e.g., screwed, to the reference means, or it is made in one piece with the reference means, and the said pendulum arm always maintains the reference means mounted rotatably on the cylinder in its zero position due to the action of the force of gravity.

According to a preferred second embodiment of the present invention, the reference means is restrictedly guided free or at least nearly free from rotation.

Nearly free from rotation means according to the present invention in all exemplary embodiments that the deviation of the angular position of the reference means from the exact zero position in relation to the press frame is negligible, i.e., a possible deviation can be ignored compared with the change in the angular position of the measuring means which is associated with the pivoting movement of the cylinder.

In this second embodiment, the reference means can be restrictedly guided free from rotation by a straight guide, which is connected to the press frame and permits a translatory movement only. The rotation-free guiding may advantageously also be brought about by a multilink hinge transmission.

In another preferred alternative of the second embodiment, the reference means engages a bracket pivotably mounted on the press frame, and spinning of the reference means, i.e., rotation of the axis of rotation of the reference means, is prevented by the said bracket. The bracket is preferably provided with an opening, especially an elongated hole, in which the engaging reference means is guided in a purely translatory manner. No spinning of the reference means takes place during this translatory guiding because of the slight pivoting movement of the bracket which is associated with it; a slight change in the angular position of the reference means in relation to the press frame cannot be completely avoided, but it is negligible.

Preferred exemplary embodiments of the present invention will be explained below on the basis of figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
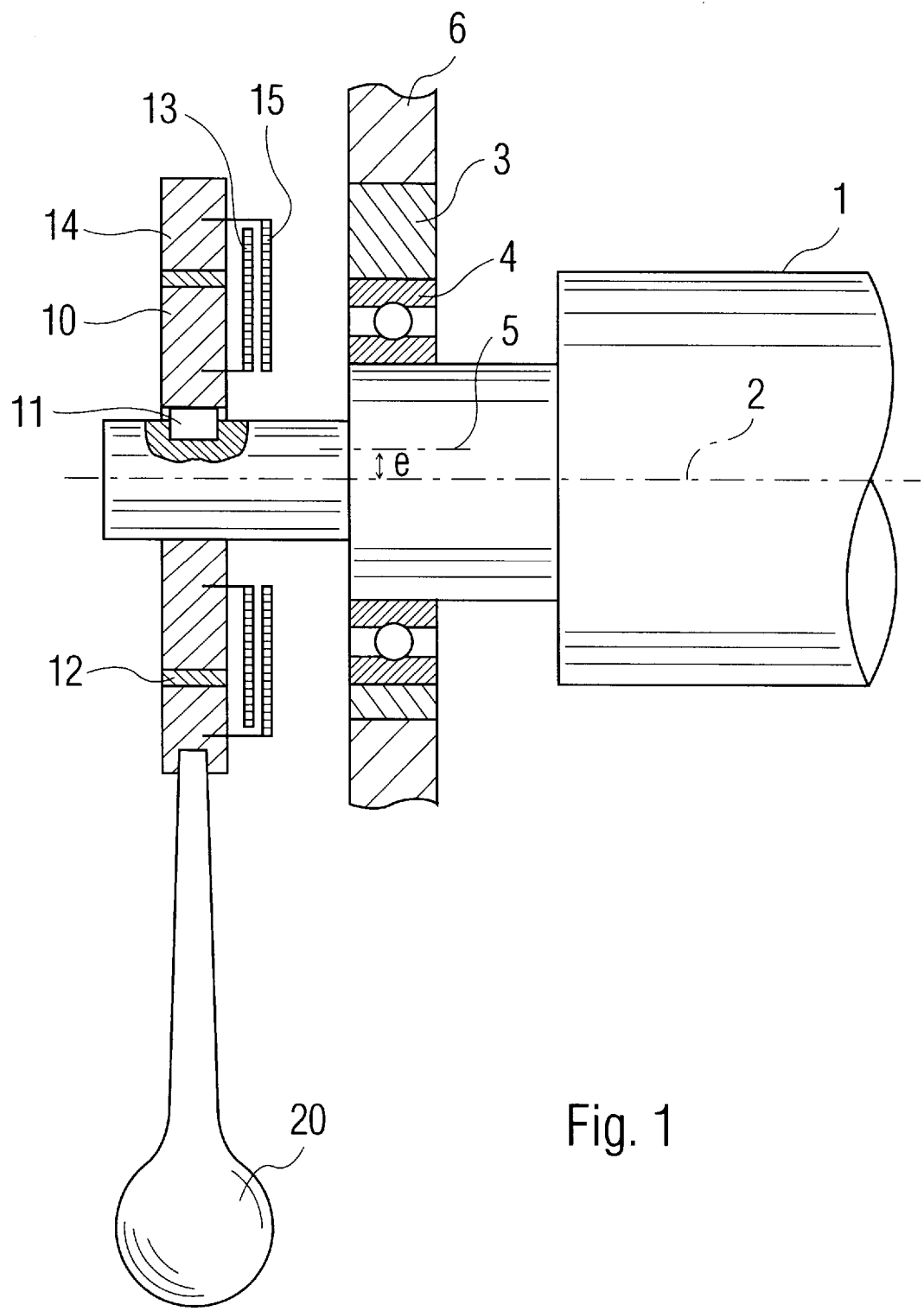
FIG. 1 is a sectional view of a shaft encoder according to the present invention with pendulum arm.

Referring to the drawings in particular, FIG. 1 shows the longitudinal section of a printing cylinder 1, which is rotatably driven around its longitudinal axis, hereinafter called cylinder axis of rotation 2, and is pivotable around a pivot axis 5. The cylinder 1 is rotatably mounted at its two outer cylinder pins, of which only one is shown in FIG. 1, in an eccentric bush 3 by means of a ball bearing 4. The eccentric bush 3 is in turn mounted rotatably in a slide bearing in a press frame 6. The cylinder 1 is pivoted around the pivot axis 5 in the known manner by means of the eccentric bush 3. The pivot axis 5 is also the axis of rotation of the eccentric bush 3 in the press frame 6. The distance between the two axes 2 and 5 is the eccentricity e.

A measuring means is fastened at the outermost end of the pin of the cylinder 1, secured against rotation in relation to the cylinder axis of rotation 2. The measuring means is formed by an inner ring 10 and a ring-shaped measuring disk 13, which is rigidly connected to it. The fact that the inner ring 10 is arranged on the pin of the cylinder 1 secured from rotation is indicated by a cotter pin 11. The measuring disk 13 has a cyclotomy (known itself) with a plurality of lines extending in the radial direction. The inner ring 10 is surrounded by an outer ring 14, which is mounted on it in a sliding pivot bearing, and to which another ring-shaped disk 15 is rigidly connected. This second disk 15 is provided with a plurality of photocells for scanning the line graduation of the measuring disk 13. The relative angular position of the measuring disk 13 in relation to the second disk 15, which is thus used as a reference for the angular position of the first graduated disk 13, is detected by means of the photoelectric scanning, which is only a preferred embodiment of scanning, but to which the present invention is not exclusively limited, and the angular position of the cylinder 1 in relation to the outer ring 14 used as a reference is determined from this with the second disk 15, hereinafter called reference disk. The outer ring 14 and the reference disk 15 form a reference means for the measuring means.

The angular position of the reference disk 15 in space and consequently also in relation to the press frame 6 is maintained at a constant value. The gravity of the earth is used for this purpose by a weight, a pendulum arm 20 in the exemplary embodiment, being fastened to the outer ring 14. This desired balance error is so great that maintenance of the zero position of the reference means is guaranteed in the case of a corresponding rotatable mounting 12 of the reference means, of the outer ring 14 on the inner ring 10 in the exemplary embodiment.

Figure 2:
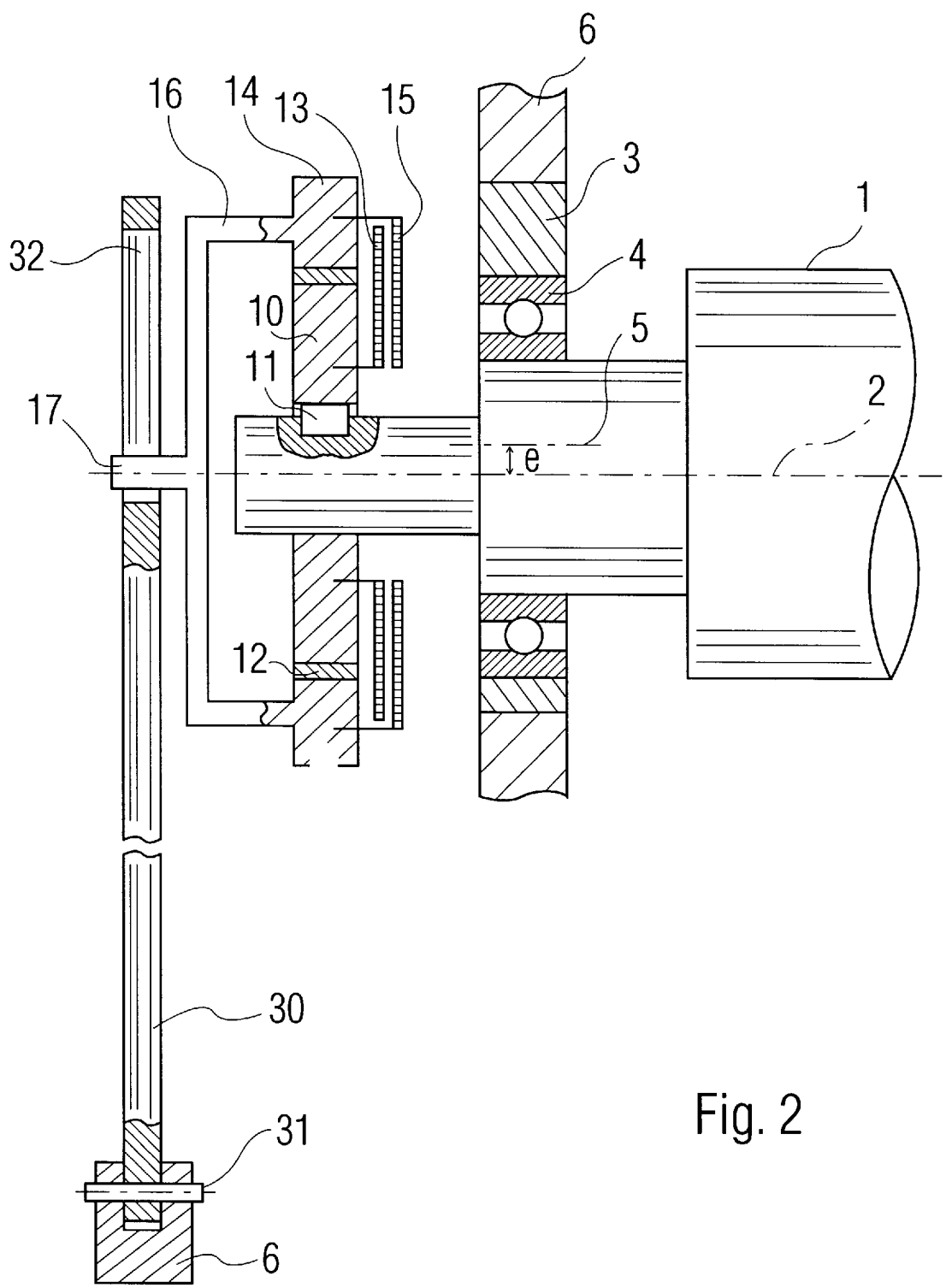
FIG. 2 is a sectional view of a shaft encoder according to the present invention with restricted guiding by means of a pivotable bracket.

FIG. 2 likewise shows a longitudinal section of the pin end of a cylinder with a reference means, which is maintained in its zero position. Instead of the pendulum arm used in the exemplary embodiment according to FIG. 1, a bracket 30 is used in the exemplary embodiment according to FIG. 2. The bracket 30 replaces the pendulum arm of the above-described exemplary embodiment. The design of the shaft encoder itself corresponds to the exemplary embodiment according to FIG. 1 regarding the arrangement of the inner ring 10 and of the outer ring 14 with the corresponding disks 13 and 15. The cylinder 2 and its, pivoting mechanism also correspond to the exemplary embodiment according to FIG. 1.

The bracket 30 is mounted on the press frame 6 pivotably around a pivot axis 31. At its end facing away from the pivot axis 31, the bracket 30 has an elongated opening 32, which is designed as a simple elongated hole in the exemplary embodiment. The pivot axis 31 of the bracket 30 extends in parallel to the cylinder axis of rotation 2. A rigid guide means 17, which is rigidly connected to the reference means, is restrictedly guided in the opening 32 during a pivoting movement of the cylinder. The reference means is maintained in its zero position by the restricted guiding during printing operation, especially also during the pivoting of the cylinder 2.

Figure 3:
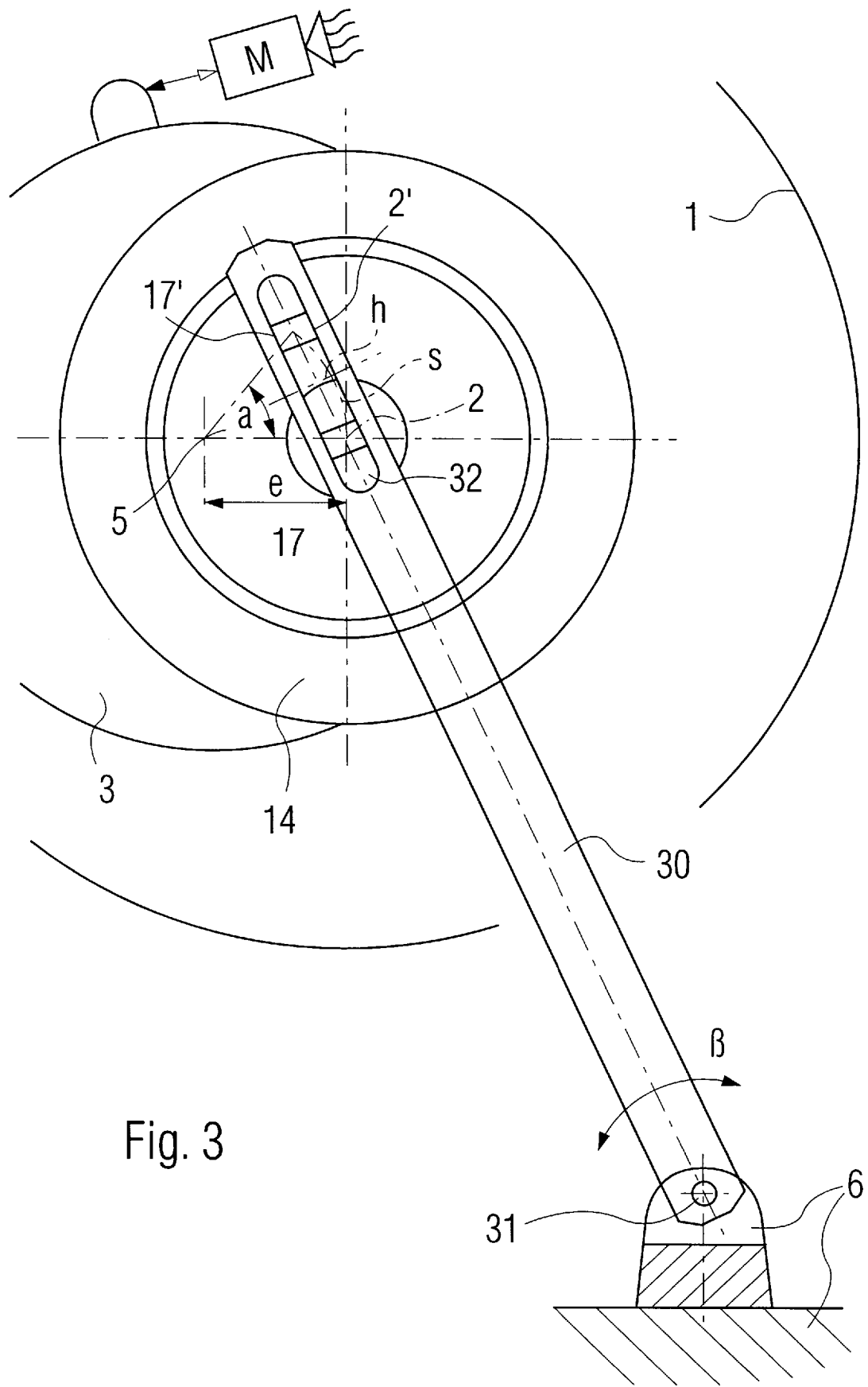
FIG. 3 is a front view of the shaft encoder according to FIG. 1.

The arrangement according to FIG. 2 is shown in FIG. 3 as a front view toward cylinder 1. By means of a motor M, which acts on the eccentric bush 3, the cylinder 1 is pivoted around the eccentric axis 5, which is also the pivot axis of the cylinder 1, by an angle a from its zero position, namely, from the printing position. During this pivoting movement, the cylinder axis of rotation 2 describes a segment arc s into the pivoted-off position indicated by 2'.

The reference means 14, 15 would also be rotated by the angle a out of its zero position due to the pivoting in a prior-art shaft encoder. To prevent this, the reference means 14 is rigidly connected in the exemplary embodiment according to FIGS. 2 and 3 to the guide means 17, which is restrictedly guided in the opening 32 of the holding means 30 at a laterally closely spaced location. The guide means 17 is designed in the exemplary embodiment as a simple square bolt, which is slidingly guided in the opening 32 in a purely translatory manner; tilting is prevented from occurring as a result. The longitudinal axis of the guide means 17 coincides with the cylinder axis of rotation 2 in the exemplary embodiment according to FIGS. 2 and 3; however, this is not absolutely necessary. The angular position of the reference means does not change by the pivot angle a of the cylinder 1, but by a much smaller pivot angle β of the bracket 30 during the pivoting of the cylinder 1.

The position of the pivot axis 31 of the bracket 30 is selected relative to the pivot axis 5 of the cylinder 1 such that the longitudinal axis of the bracket 30 forms the extension of a straight line connecting the two end positions of the cylinder axis of rotation 2, which are indicated by the reference numbers 2 and 2' in FIG. 3. In other words, the vertical line extending through the pivot axis 5 of the cylinder 1 to the line connecting the two positions of the cylinder axis of rotation 2, i.e., to the line connecting the printing position, which is likewise designated by 2, and the pivoted-off position designated by 2', forms the bisecting line of the pivot angle α. The greatest vertical distance h between the line connecting the two end positions 2 and 2' and the arc segment s on which the cylinder axis of rotation 2 is moving during the pivoting of the cylinder 1 is located on this bisecting line. Due to the deviation of the arc segment s from the straight line connecting the positions 2 and 2', the zero position of the reference means changes slightly during the pivoting of the cylinder 1. This change, i.e., the angle deviation from the zero position, corresponds to the pivot angle β by which the bracket 30 is pivoted around its own pivot axis 31 during the pivoting movement of the cylinder 1. However, this change in the angular position from the zero position is negligible compared with the angular change α, which would correspond to the pivoting movement of the cylinder 1.

The angular deviation s can be calculated from the following formula:

$$\sin \beta = e(l - \cos \alpha/2)/l,$$

in which e is the eccentricity of the cylinder axis of rotation 2 in relation to the cylinder pivot axis S and l is the effective length of the bracket 30. The effective length l corresponds to the distance between the pivot axis 31 and the cylinder axis of rotation 2 restrictedly guided in the opening 32. The pivot angle a of the cylinder is "reduced" twice; first, the angle α is reduced to the now effective "stroke" h, and secondly, the latter is reduced to the pivot angle β as a function of the length l.

Figure 4:
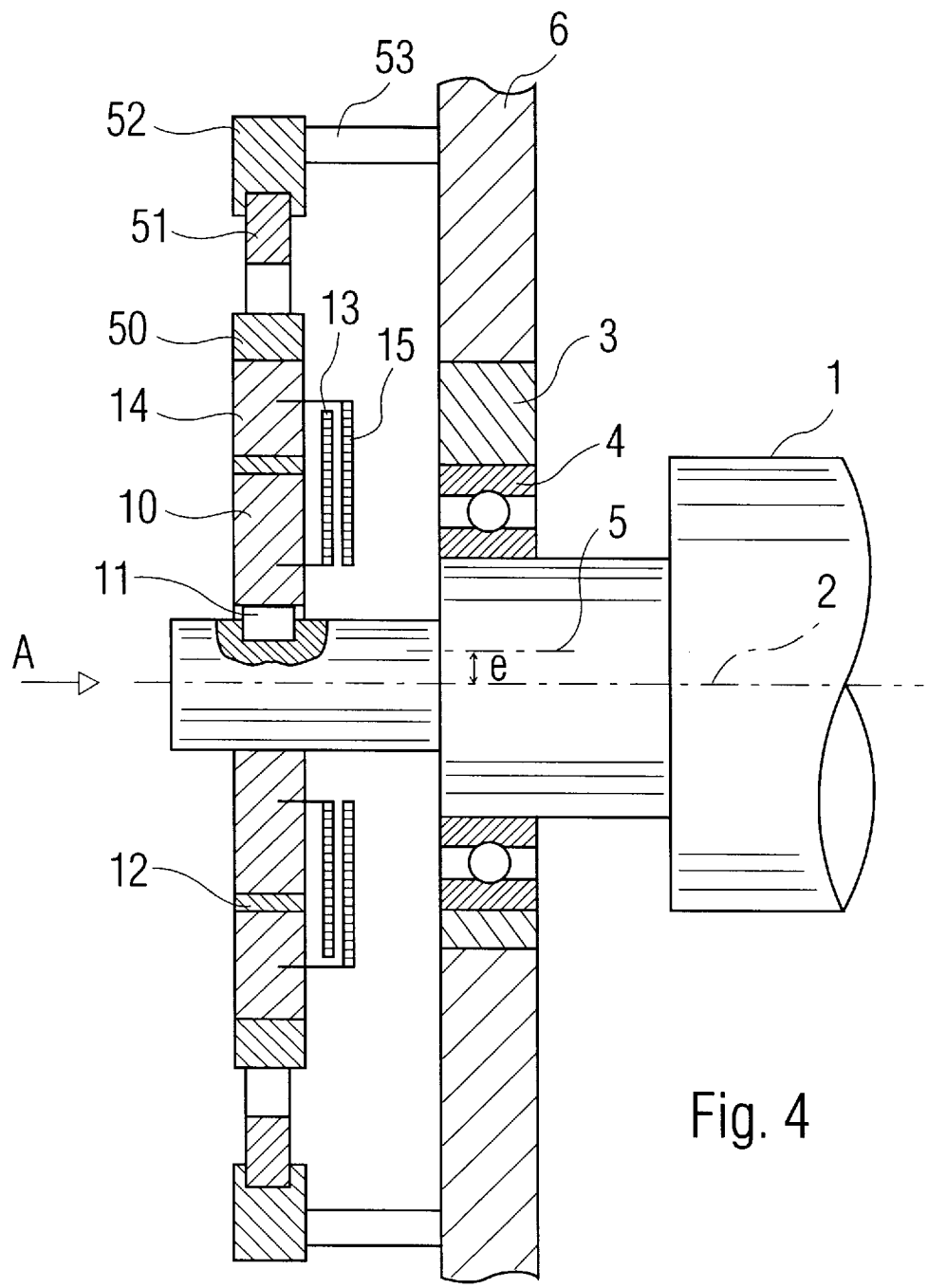
FIG. 4 is a sectional view of a shaft encoder according to the present invention with restricted guiding by means of a straight guide.
Figure 5:
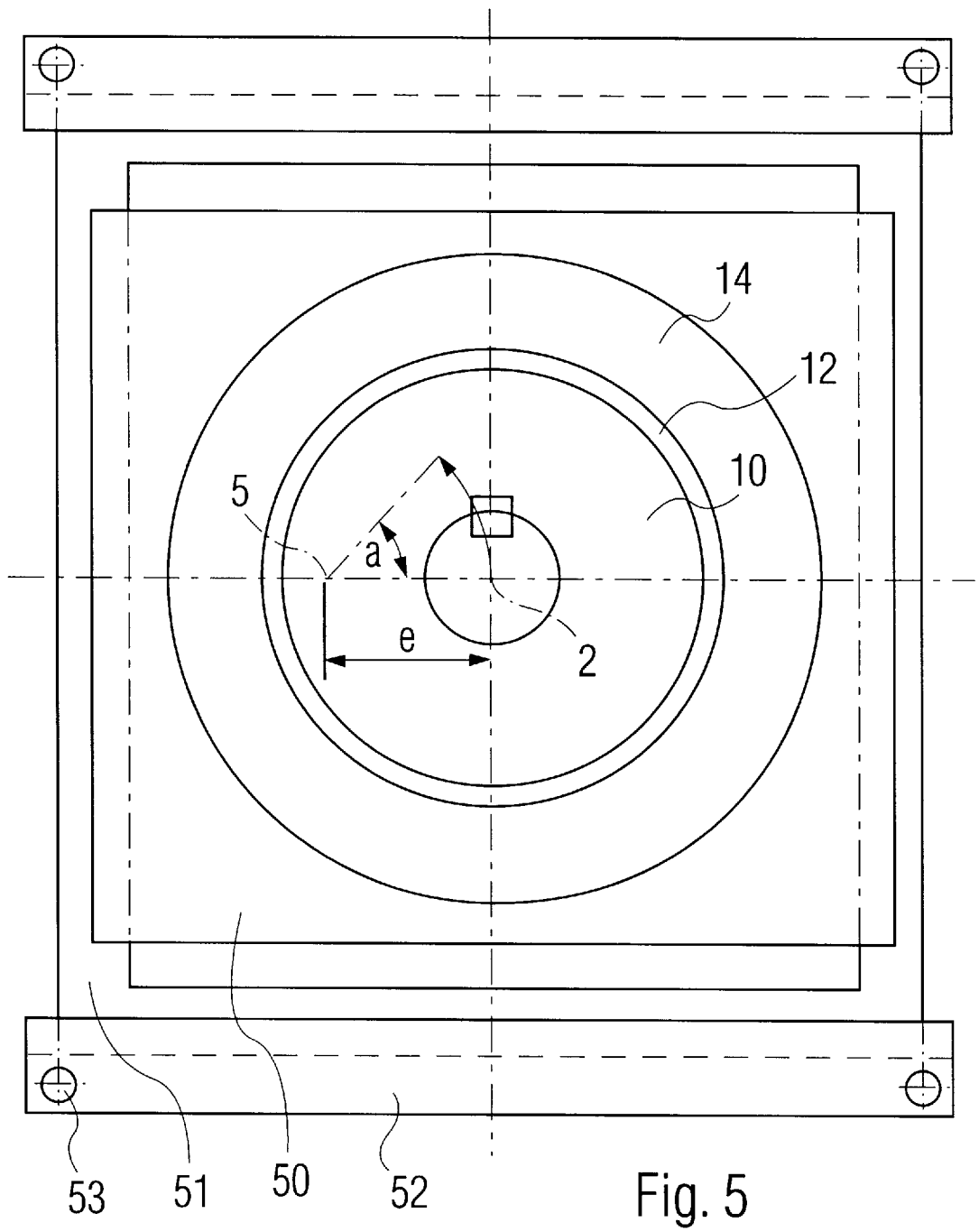
FIG. 5 is view A according to FIG. 4.

Another exemplary embodiment for maintaining the zero position of the reference means is shown in FIGS. 4 and 5.

FIG. 4 shows again the longitudinal section of the pin end of the cylinder 1 with the eccentric bush 3 rotatably mounted on it and with the inner ring 10 of the measuring means, which inner ring is fastened to it in a nonrotating manner. As in the above two exemplary embodiments, the outer ring 14 of the reference means is mounted in a sliding pivot bearing on the inner ring 10 of the measuring means. The outer ring 14 is prevented from rotating by a straight guide in this exemplary embodiment. The straight guide permits a purely translatory movement of the outer ring 14 following the pivoting movement of the cylinder 1.

The straight guide is designed as a cross slide in the exemplary embodiment. A first guide part 52 of the cross slide is rigidly fastened to the frame 6 by means of a bolt or a screw 53. A second guide part 51 is slidingly guided in a groove of the first guide part 52, which extends at right angles to the plane of FIG. 4. A third guide part 50 of the cross slide is likewise restrictedly guided by another groove provided in the said second guide part 51 in a straight line, namely, in a direction extending at right angles to the straight guide of the second guide part 51 and at right angles to the axis of rotation 2 of the cylinder 1. The outer ring 14 is rigidly connected to the third guide part 50.

FIG. 5 shows view A according to FIG. 4. The directions of movement of the two carriage parts 50 and 51 are indicated under the reference numbers 50 and 51 of the third and second guide parts. The outer ring 14 seated on the third guide part or carriage part 50 is thus able to freely perform translatory movement in the plane of view A, while a rotation of the outer ring 14 around the axis of rotation 2 of the cylinder 1 is prevented.

Figure 6:
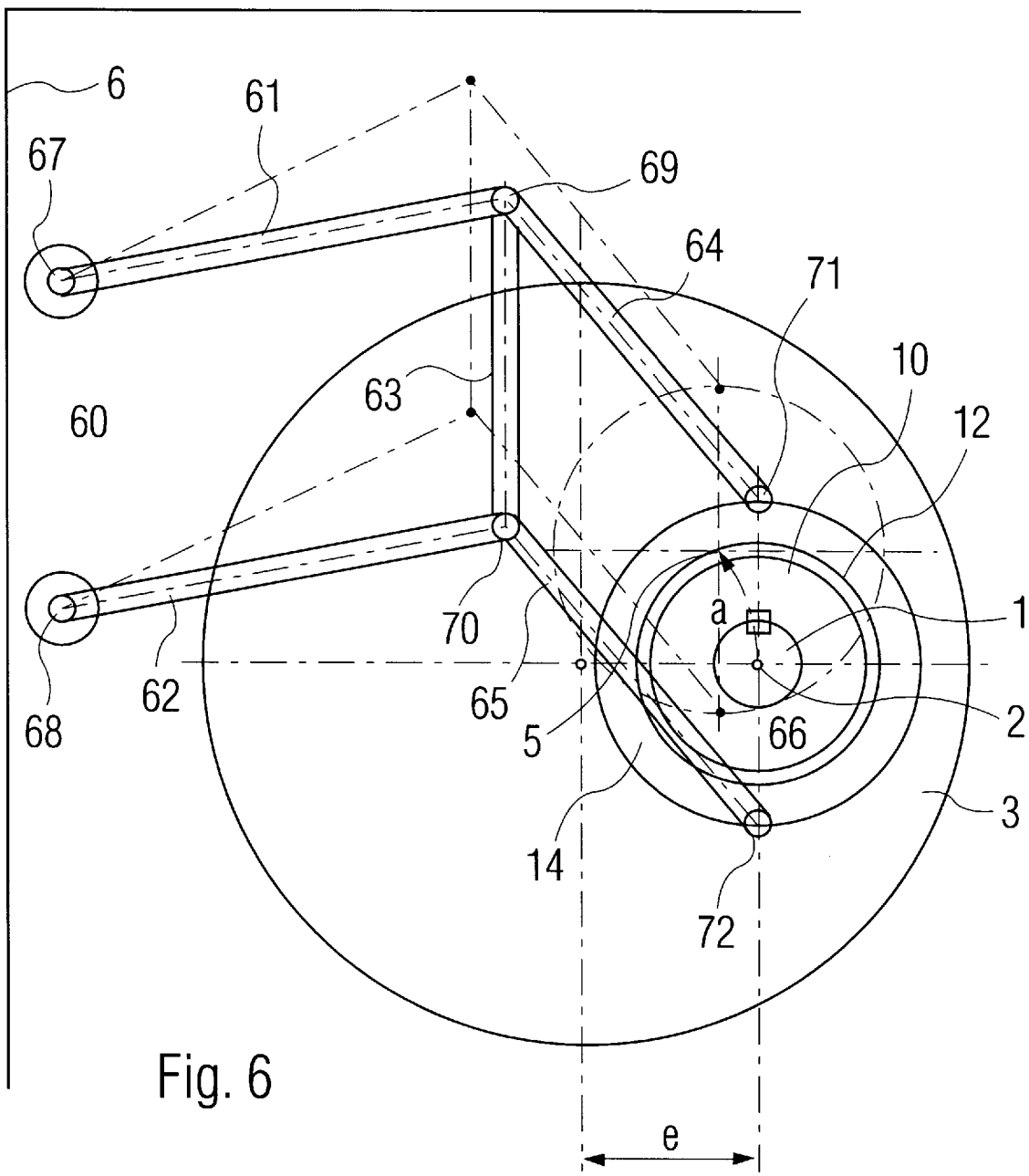
FIG. 6 is schematic view of a shaft encoder according to the present invention with restricted guiding by means of a hinge transmission.

FIG. 6 shows another example of a restricted guiding for preventing spinning of the reference means. The restricted guiding is formed according to this exemplary embodiment by a multilink hinge transmission. The transmission has the shape of two parallelograms, which share one side. A first side 60 is formed by the frame 6 between a hinge 67, which is rigidly connected to the frame, and a hinge 68, which is rigidly connected to the frame. One side 61 or 62 each is rotatably mounted on the frame 6 in both hinges 67 and 68. At their ends facing away from the hinges 67 and 68, the two sides 61 and 62 of the transmission are rotatably connected to additional sides 64 and 65. The corresponding hinges are provided with the reference numbers 69 and 70. These two hinges 69 and 70 are maintained at a constant distance from one another by a side 63. The ends of the two sides 64 and 65 facing away from these two hinges 69 and 70 are rotatably connected at 71 and 72 to the outer ring 14 of the reference means. The last side 66 of the hinge transmission shown is formed between these latter two hinges 71 and 72.

All sides 60 through 66 are rigid. The sides 61–65 of the two parallelograms in the exemplary embodiment are formed by simple bars. The axes of rotation of the six hinges 67 through 72 extend in parallel to the axis of rotation 2 of the cylinder 1. The hinge transmission according to FIG. 6 in the form of a double parallelogram with the common side 63 guides the outer ring 14, which forms the parallelogram side 66 between the hinges 71 and 72 themselves, free from rotation, in a purely translatory manner, following a pivoting movement of the cylinder 1 around the pivot axis 5 in the plane of FIG. 6. The first, frame-side side 60, the common side 63, and the side 66 formed at the outer ring 14 have equal length and are parallel to one another during all phases of the pivoting movement of the cylinder 1, corresponding to the design of the transmission as a double parallelogram. Due to the side 60 being fixed to the frame 6, the outer ring 14 is thus prevented from rotating during the pivoting of the cylinder 1.

While specific embodiments of the invention have been shown and described in detail to illustrate the application of the principles of the invention, it will be understood that the invention may be embodied otherwise without departing from such principles.

What is claimed is:

1. A shaft encoder arrangement for a cylinder of a printing press, the printing press having a frame, the arrangement comprising:

measuring means arranged at the cylinder and secured against rotation in relation to an axis of rotation of the cylinder;

reference means mounted on the cylinder rotatably around the axis of rotation of the cylinder, said measuring means for detecting the position of said measuring means in relation to said reference means for determining an angular position of the cylinder in relation to the frame of the printing press; and holding means for maintaining said reference means in an at least essentially unchanged angular position in relation to said frame of the printing press in the case of a change in the angular position of the cylinder.

2. The shaft encoder in accordance with claim 1, wherein said measuring means has an inner ring, which is fastened secured from rotation on a pin end of said cylinder, and said reference means has a said outer ring, which is rotatably mounted on an outer circumferential surface of said inner ring.

3. The shaft encoder in accordance with claim 1, wherein said holding means is formed by a pendulum arm fastened to said reference means.

4. The shaft encoder in accordance with claim 1, wherein said reference means is restrictedly guided by said holding means, in the case of a change in the angular position of the cylinder, in a manner that is at least nearly free from rotation.

5. The shaft encoder in accordance with claim 4, wherein said holding means is formed by a bracket which is pivotably mounted on the frame and is engaged by said reference means for restricted guiding of said reference means.

6. The shaft encoder in accordance with claim 5, wherein said bracket is provided with an opening, which is engaged by said reference means and in which said reference means is guided in a purely translatory manner.

7. The shaft encoder in accordance with claim 4, wherein said reference means is guided free from rotation by a straight guide connected to the frame, said straight guide permitting a translatory movement of said reference means during a change in the angular position of the cylinder.

8. The shaft encoder in accordance with claim 7, wherein said straight guide is formed by a cross slide, which has a first guide part fastened to said frame, a second guide part guided therein in a straight line, and a third guide part, which is guided in a straight line in said second guide part and to which said outer ring is fastened.

9. The shaft encoder in accordance with claim 4, wherein said reference means is guided free from rotation by a multihinge transmission during a change in the angular position of the cylinder.

10. The shaft encoder in accordance with claim 4, wherein said multihinge transmission is a multilink hinge transmission.

11. The shaft encoder in accordance with claim 9, wherein said multihinge transmission is in the form of two parallelograms abutting each other at a common side, wherein sides of said two parallelograms are rigid and are rotatably connected to one another.

12. The shaft encoder in accordance with claim 11, wherein said first side is fixed to said frame and another said side is fixed to said outer ring, wherein said other side is held in parallel to said first side during a change in the angular position of the cylinder (1).

13. A process for synchronizing the rotary movement of a pivotable cylinder of a printing press during the pivoting up of that cylinder to a countercylinder, comprising the steps of:

determining the angular position of the cylinder during pivoting up movement in relation to a reference means; and maintaining the reference means in an at least approximately constant angular position in relation to a frame of the printing press even during the pivoting up movement.

14. A printing press shaft cylinder and encoder arrangement, comprising:

a cylinder;

a printing press frame;

measuring means arranged at said cylinder and secured against rotation in relation to an axis of rotation of the cylinder;

reference means mounted on the cylinder rotatably around the axis of rotation of the cylinder, said measuring means for detecting the position of said measuring means in relation to said reference means for determining an angular position of said cylinder in relation to said frame of said printing press; and holding means for maintaining said reference means in an at least essentially unchanged angular position in relation to said frame of said printing press in said case of a change in said angular position of said cylinder.

15. The arrangement in accordance with claim 14, wherein said measuring means has an inner ring, which is fastened secured from rotation on a pin end of said cylinder, and said reference means has a said outer ring, which is rotatably mounted on an outer circumferential surface of said inner ring.

16. The arrangement in accordance with claim 14, wherein said holding means is formed by a pendulum arm fastened to said reference means.

17. The arrangement in accordance with claim 14, wherein said reference means is restrictedly guided by said holding means, in said case of a change in said angular position of said cylinder, in a manner that is at least nearly free from rotation.

18. The arrangement in accordance with claim 17, wherein said holding means is formed by a bracket which is pivotably mounted on said frame and is engaged by said reference means for restricted guiding of said reference means.

* * * * *